Aug. 3, 1926.  
J. P. TEMPLEMAN  
1,594,912  
HAND BRAKE FOR RAILWAY CARS  
Filed April 16, 1926  
2 Sheets-Sheet 2

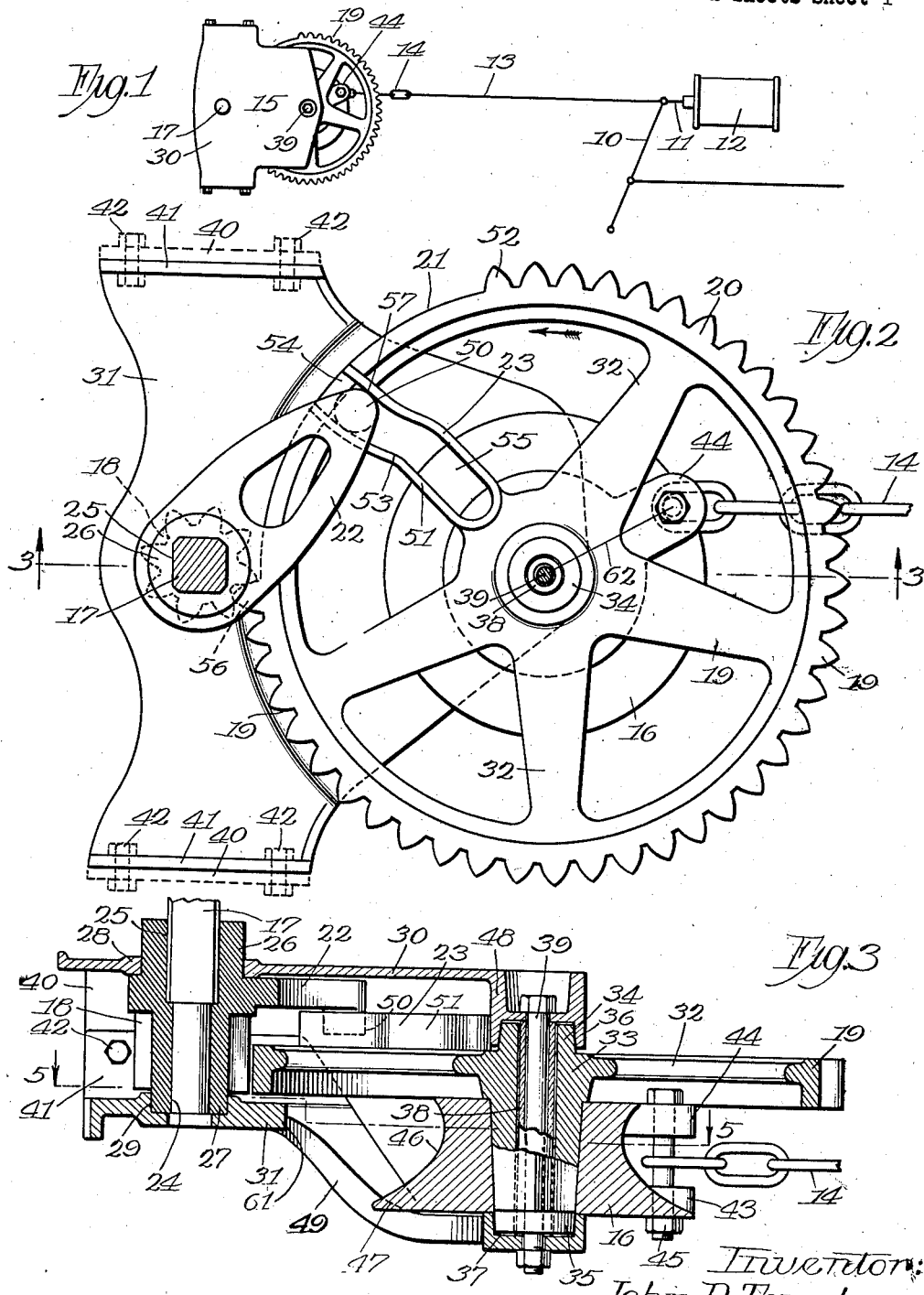

Inventor:  
John P. Templeman  
By Wilson, Mann & Co.  
Attys.

Patented Aug. 3, 1926.

1,594,912

UNITED STATES PATENT OFFICE.

JOHN P. TEMPLEMAN, OF CHICAGO, ILLINOIS.

HAND BRAKE FOR RAILWAY CARS.

Application filed April 16, 1926. Serial No. 102,401.

This invention relates to hand brakes for railway cars and has for its principal object to permit the slack to be taken up quickly and then permit the brakes to be applied with pressure comparable with a service application by air. Further objects and advantages of the invention will become apparent as the disclosure proceeds and the description is read in connection with the accompanying drawings, in which—

Fig. 1 is a diagrammatic plan view illustrating the preferred form of the invention applied in connection with a conventional form of foundation brake gear;

Fig. 2 is a horizontal section, showing the operating parts of the hand brake mechanism in plan;

Fig. 3 is a vertical section taken on the line 3—3 of Fig. 2;

Figure 4:
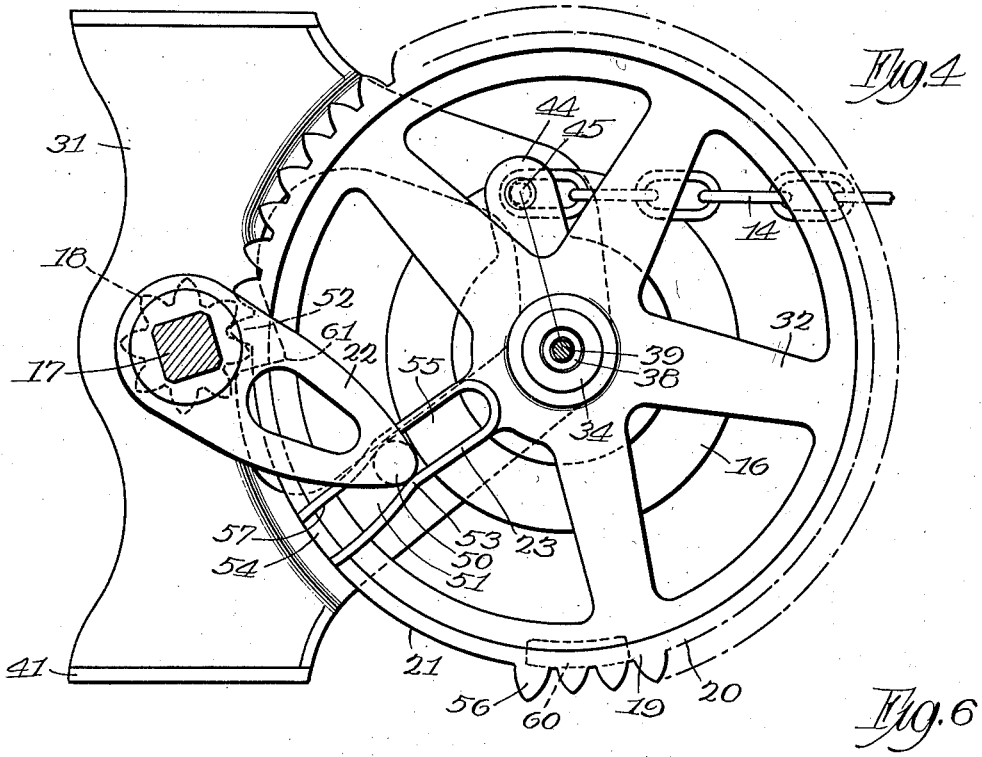
Fig. 4 is a view similar to Fig. 2 showing the parts at an advanced stage of operation with respect to the position shown in Fig. 2.

In the diagrammatic view shown in Fig. 1, 10 indicates a cylinder lever of conventional foundation brake gear by which the push rod 11 of a conventional air brake cylinder 12 operates the brakes. The hand brake rod 13 is secured to the push rod 11 in the usual way and equipped at its otherwise free end with a length of chain 14 adapted to cooperate with the winding mechanism of the hand brake generally indicated in Fig. 1 by the numeral 15.

This mechanism includes (Fig. 3) a drum 16 and a shaft 17, mounted to rotate about parallel axes, together with a quick take-up drive by which the shaft gives the drum rapid rotation and a power drive by which it continues the rotation of the drum at less speed but with the required power for proper application of the brakes.

The power drive includes a pinion 18, rotating with the shaft 17, and an interrupted gear 19 rotating with the drum, and having a toothed segment 20 and a blank segment 21, the latter in this illustration comprising about one-fourth the circumference of the gear.

The quick take-up drive includes an arm 22, rotating with the shaft 17, and a cam 23 (Fig. 2) rotating with the gear 19.

The pinion 18 and the arm 22 are, for convenience in manufacture, made in one piece, the hub of which has a central bore 24 enlarged and made polygonal at its upper portion 25 to receive the lower end of a conventional brake staff represented by the shaft 17. The opposite ends 26 and 27 of the hub form trunnions which are mounted in bearings 28 and 29 carried by the upper and lower members 30 and 31 of a frame or casing. The lower bearing 29 is stepped and takes the end thrust on these parts.

The gear 19 includes spokes 32 and a hub 33, the latter having trunnions 34 and 35 journaled in bearings 36 and 37 carried by the upper and lower frame members 30 and 31. Both of these bearings are stepped and the bore of the hub receives a sleeve 38 which rests against the opposed faces of the bearings and is clamped between them by a bolt 39. The upper and lower frame members 30 and 31 at the side opposite to the bearings 36 and 37 have telescoping flanges 40 and 41 secured together by bolts 42. These bolts, the sleeve 38, and the bolt 39, secure the frame members rigidly together and hold them and the operating parts in proper relation. This construction also permits the assembly operation to be rapidly and easily performed. The operating parts being assembled on one frame member, the other is applied and the bolt 39 inserted and drawn down; the flanges 40 and 41 are then drilled and the bolts 42 inserted and set up. The bearing 36 is carried by a laterally projecting flange on the upper frame member 30, best seen in Fig. 1, which is equipped with a hub 48, cupped at its upper side to receive the head of the bolt 39. The bearing 37 is carried by downwardly and inwardly inclined arms 49 on the lower frame member 31. The sleeve 38 is slightly longer than the hub 33 to permit free rotation of the latter without binding.

The drum 16 and the corresponding portion of the hub 33 are provided with complemental polygonal surfaces permitting ready assembly of the two in a selected angular relation. The drum is provided with spaced lugs 43 and 44 through which a bolt 45 is inserted for securing the chain 14. The drum surface 46 is somewhat unsymmetrical, being smaller at the upper side in Fig. 3, than at the lower side, providing a relatively wide flange 47 at the bottom to co-operate with the chain. The normal position of the parts, when the brakes are released, is shown in Fig. 2. Clockwise rotation of the shaft 17 in that figure causes like rotation of the arm 22 and a pin 50, extending downwardly from that arm coacts with the surface 51 on the cam 23 and gives the gear 19 a counter-clockwise rotation, at first slow, then very rapid, and then slow again, as the parts approach the position shown in Fig. 4. The first tooth 52 of the gear 19, which was somewhat widely separated from the pinion 18, Fig. 2, is now about to engage the pinion. The surface 51 is, therefore, curved, as indicated at 53, to permit the gear to slow up under the resistance of the brake rigging and thus prevent the tooth 52 from striking the pinion with a blow. The curving of the surface 53 continues to the left and downwardly in Fig. 4, allowing the pinion to take up the burden of revolving the gear and the pin 50 to be relieved of that burden and escape through the open end 54 of the slot 55 in the cam 23. Continued rotation of the shaft 17 in a clockwise direction will cause continued and powerful rotation of the gear 19 and, hence, the drum 16, whereby the cylinder lever is operated to apply the brakes in the same manner and in substantially the same pressure as they are applied by the air cylinder 12.

The brakes may be held applied in the usual way and, when released, the mechanism just described tends to execute a reverse movement, the gear rotating the pinion and the arm 22, bringing the pin 50 back into the slot 55. As the parts approach the position shown in Fig. 2, an enlarged tooth 56 on the opposite side of the blank segment 21 from the tooth 52 comes into engagement with the pinion 18 and at about the same instant the pin 50 engages the surface 57 on the cam 23 and binds thus locking the rotating parts against vibration during the travel of the car. The pull of the brake rigging on the chain 14 has a constant tendency to urge the pin 50 into this binding engagement, and any reverse, or counter-clockwise movement of the gear 19, due to swaying or jarring of the car, is strongly resisted by the fact that the pressure of the surface 57 on the pin is almost directly towards the axis of the shaft 17. However, the binding is easily released by turning the shaft 17 when it is desired to apply the brakes.

The use of the large tooth 56 is also of advantage in taking up wear, for when it engages the pinion it tends to pry the pinion and the gear apart, thus forcing the trunnions against the corresponding sides of their bearings.

Figure 6:
Fig. 6 is a vertical section taken on the line 6—6 of Fig. 5.
Figure 5:
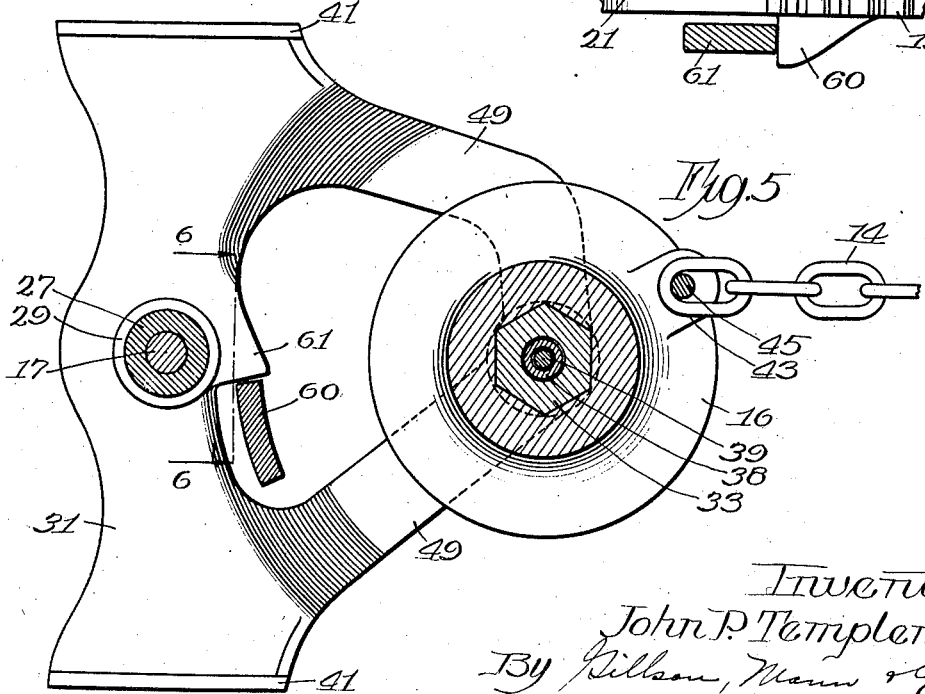
Fig. 5 is a horizontal sectional view taken on the line 5—5 of Fig. 3.

Adjacent to the tooth 52 the gear is equipped with a shoulder 60, Figs. 5 and 6, which is adapted to strike a stop 61 on the frame to positively limit the movement of the parts towards the last position.

The lugs 43 and 44 are in such relation to the stop 61 that the axis of the lever arm 62 formed by the lugs by which the drum applies power to the chain lies in about the position indicated in Fig. 2, when the slack is entirely out. As a result the initial movement of this lever arm is through the quadrant in which the end of the chain is given the greatest movement in the direction of its length and, therefore, the slack is taken up most rapidly, also the constant pull of the chain when the brakes are released is given a tendency to rotate the gear in a clockwise direction, with the results above described.

The cam 23 in this illustration is formed by one of the spokes of the gear wheel being provided with a substantially radial slot bent or curved at an intermediate position. The exact form of this slot and the corresponding cam surfaces will vary with the particular effects desired. The shape shown will produce the effects described in a very satisfactory manner.

The surface 57 is slightly concave to foster the binding engagement.

Use has been made of specific description and illustration in order to disclose the invention, but it is intended that nothing contained herein shall unnecessarily limit the following claims, or require a construction thereof that would permit the substance of the invention to be used without infringement.

This application is a substitute for application Serial No. 38,153, filed June 19, 1925, allowed August 10, 1925.

I claim as my invention:—

1. In a hand brake for railway cars, the combination of a brake shaft, a brake chain, a drum for the chain, a quick take-up drive between the shaft and the drum, including an arm on each with a pin and slot connection between them and a power drive between the shaft and the drum including a pinion on the shaft and an interrupted gear on the drum.

2. In a hand brake for railway cars, the combination of a brake shaft, a brake chain, a drum for the chain, an interrupted gear and a slotted arm on the drum, a pinion on the brake shaft for coaction with the interrupted gear, and an arm on the brake shaft having means to coact with the slotted arm on the drum when the pinion is not coacting with the interrupted gear.

3. In a hand brake for railway cars, the combination of a brake shaft, a brake chain, a drum for the chain, a gear on the drum having a blank segment, a pinion on the brake shaft to coact with said gear, a slotted arm on the drum opening in a position corresponding to the middle of the blank segment on the gear, and an arm on the brake shaft of greater length than the radius of the pinion and having means to coact with the slotted arm when the blank segment is opposite to the pinion.

4. In a hand brake for railway cars, the combination of a brake shaft, a drum, a chain arm on the drum, a chain having its live end attached to the chain arm, a quick take-up driving connection and high power driving connection between the shaft and the drum adapted to operate successively and give the drum a rapid rotation to take up the slack, followed by a slow powerful rotation to apply the braking pressure and means to limit the unwinding movement of the drum to a position in which the chain arm is at an obtuse angle to the direction of the chain and the quick take up and driving connection is in position to initiate the rapid rotation.

5. In a hand brake for railway cars, the combination of a brake shaft, a brake chain, a drum for the chain, a quick take-up drive between the shaft and the drum including an arm on the shaft and a cam on the drum and a power drive between the shaft and the drum including a pinion on the shaft and an interrupted gear on the drum.

6. In a hand brake for railway cars, the combination of a brake shaft, a brake chain, a drum for the chain, an interrupted gear connected with the drum, a cam connected with the drum, and presenting a working surface in a position corresponding to the interrupted portion of the gear, a pinion on the brake shaft coacting with the interrupted gear and an arm on the brake shaft having means to coact with the cam to rotate the gear at a faster rate of speed than it is rotated by the pinion.

7. In a hand brake for railway cars, the combination of a brake shaft, a brake chain, a drum for the chain, a power drive between the shaft and the drum including a pinion and an interrupted gear, and a quick take-up drive between the shaft and the drum including an arm driven by the pinion and a cam operatively connected with the drum and having a surface cooperating with the arm, said cam surface being curved to reduce the speed of the gear as it engages with the pinion.

8. In a hand brake for railway cars, the combination of a brake shaft, a brake chain, a drum for the chain, a power drive between the shaft and the drum including a pinion and an interrupted gear, and a quick take-up drive between the shaft and the drum including an arm driven by the pinion and a cam operatively connected with the drum and having a surface cooperating with the arm to cause the arm to drive the drum at a relatively high speed followed by slackened speed at the time the interrupted gear engages the pinion.

9. In a hand brake for railway cars, the combination of a brake shaft, a brake chain, a drum for the chain, a power drive between the shaft and the drum including a pinion and an interrupted gear, and a quick take-up drive between the shaft and the drum including an arm driven by the pinion and a cam operatively connected with the drum and having a surface cooperating with the arm, and means to restrain vibration of the parts when the brakes are released.

10. In a hand brake for railway cars, the combination of a brake shaft, a brake chain, a drum for the chain, a power drive between the shaft and the drum including a pinion and an interrupted gear, and a quick take-up drive between the shaft and the drum including an arm driven by the pinion and a cam operatively connected with the drum and having a surface cooperating with the arm and means to effect a binding engagement between the cam and the arm when the brakes are fully released.

11. In a hand brake for railway cars, the combination of a brake shaft, a brake chain, a drum for the chain, a power drive between the shaft and the drum including a pinion and an interrupted gear, and a quick take-up drive between the shaft and the drum including an arm driven by the pinion and a cam cooperating with the arm, and a large tooth on the gear adapted to engage the pinion and force the arm into binding engagement with the cam.

12. In a hand brake for railway cars, the combination of a brake shaft, a brake chain, a drum for the chain, a power drive between the shaft and the drum including a pinion and an interrupted gear, and a quick take-up drive between the shaft and the drum including an arm driven by the pinion and a cam operatively connected with the drum and having a surface cooperating with the arm, said surface forming a substantially radial slot, one side of which is engaged by the arm to drive the drum and the other side of which is engaged by the arm when the brakes are released.

13. In a hand brake for railway cars, the combination of a brake shaft, a brake chain, a drum for the chain, a power drive between the shaft and the drum including a pinion and an interrupted gear, and a quick take-up drive between the shaft and the drum including an arm driven by the pinion and a cam operatively connected with the drum and having a surface cooperating with the arm, a frame and means on the gear adapted to engage the frame and limit the motion of the parts when the brakes are released.

14. In a hand brake for railway cars, the combination of a brake shaft, a drum mounted to rotate on an axis parallel to the axis of the shaft, a power drive between the shaft and the drum including a pinion rotating with the shaft, and an interrupted gear rotating with the drum and a quick take-up drive between the shaft and the drum including a cam having a substantially radial slot and rotating with the drum, and an arm rotating with the shaft and having a pin adapted to engage with said slot.

15. In a hand brake for railway cars, the combination of a brake shaft, a brake chain, a drum for the chain, a power drive between the shaft and the drum including a pinion rotating with the shaft and an interrupted gear rotating with the drum and engaging with the pinion, and a quick take-up drive between the shaft and the drum adapted to drive the drum through the angle corresponding to the interrupted portion of the gear and including a cam having a substantially radial open-ended slot rotating with the drum, and an arm rotating with the shaft and cooperating with the cam.

In testimony whereof I affix my signature.

JOHN P. TEMPLEMAN.